Nov. 18, 1941.    F. V. WILSON, JR., ET AL    2,262,827
METHOD OF USING JIG TABLES
Filed May 9, 1938

INVENTOR
F. VAUX WILSON, JR.
BY W. HENRY NEUBECK
Albert Sperry
ATTORNEY

Patented Nov. 18, 1941

2,262,827

UNITED STATES PATENT OFFICE 2,262,827

METHOD OF USING JIG TABLES

Francis Vaux Wilson, Jr., Morrisville, Pa., and William Henry Neubeck, Trenton, N. J., assignors to Homasote Company, Incorporated, Fernwood, Ewing Township, N. J., a corporation of New Jersey Application May 9, 1938, Serial No. 206,794

4 Claims. (Cl. 144—309)

This invention relates to a work table or jig table adapted for use in assembling and securing members together to form a construction and particularly to jig tables for use in the construction of building sections employed in producing prefabricated or semi-prefabricated buildings.

In the construction of building sections and many other constructions it is desirable to assemble the members in a predetermined arrangement according to a diagram such as the plans of a house or other structure to be erected and to locate the members and secure them together quickly and easily. It is also necessary in most cases that the jig table employed be capable of ready adjustment or manipulation to assemble members in different arrangements for producing structures having different dimensions or for producing different sections of the same structure.

In accordance with the present invention the desired flexibility of use and application of a jig table, is obtained by providing the table with movable positioning elements together with scales for indicating the positions in which various members of the section to be built are to be arranged. In constructing a wall section, for example, positioning elements are provided which are relatively movable so that sections of any desired height may be produced. Scales are provided for locating elements longitudinally of the section and for this purpose it is preferable to provide both a fixed scale and a movable scale located on or adjacent each of the positioning elements. It is then possible to determine the positions in which members are to be located with respect to the ends of the section and also to locate their positions with respect to each other. These positions can be determined very easily, without resorting to calculations or incurring the delays incident to usual methods of laying out and assembling the member of a construction.

One of the objects of the present invention is to reduce the time, cost and labor required to produce constructions such as building sections or the like.

Another object of the invention is to provide a novel type of jig table and method of using the same whereby the members employed in producing building sections or other constructions may be quickly and easily assembled.

A further object of the invention is to provide a jig table with movable elements together with scales for indicating the positions in which members are to be located with respect to said elements.

A specific object of the invention is to provide a jig table with elements for locating the upper and lower members of a wall section together with fixed and movable scales associated with said elements for indicating the position in which members extending between the upper and lower members are to be located.

These and other objects and features of the present invention will appear from the following description thereof in which reference is made to the accompanying figures of the drawing illustrating a preferred construction designed for use in producing building sections.

Figure 1:
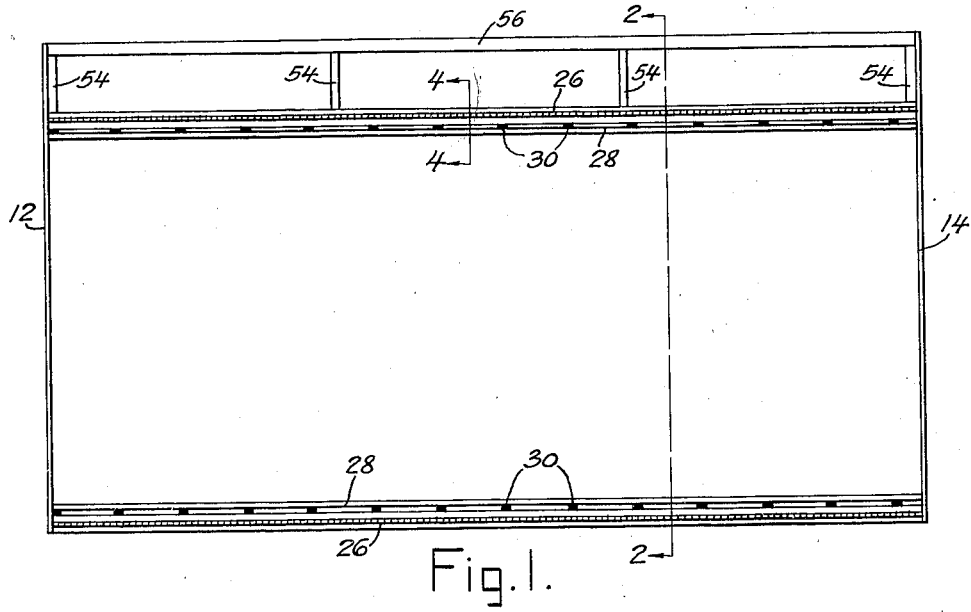
Fig. 1 is a plan view of a jig table embodying the present invention.
Figure 2:
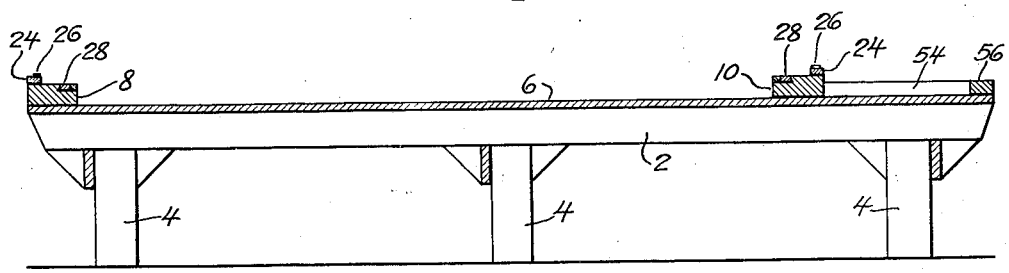
Fig. 2 is a vertical sectional view of the construction illustrated in Fig. 1 taken on the line 2—2 thereof.

In that form of the invention illustrated in the drawing a jig table is provided with a base or frame 2 supported on legs 4 or otherwise and has a working surface 6 which preferably extends over substantially the entire top of the base to provide a surface on which tools, nails and the like may be laid while working at the table.

A positioning element 8 is located near the front of the table and is fixed in position whereas a complementary positioning element 10 is located on the table near the rear thereof and is slidably movable toward and away from the stationary element 8 along suitable guides 12 and 14 at the ends of the table.

Figures 3, 4:
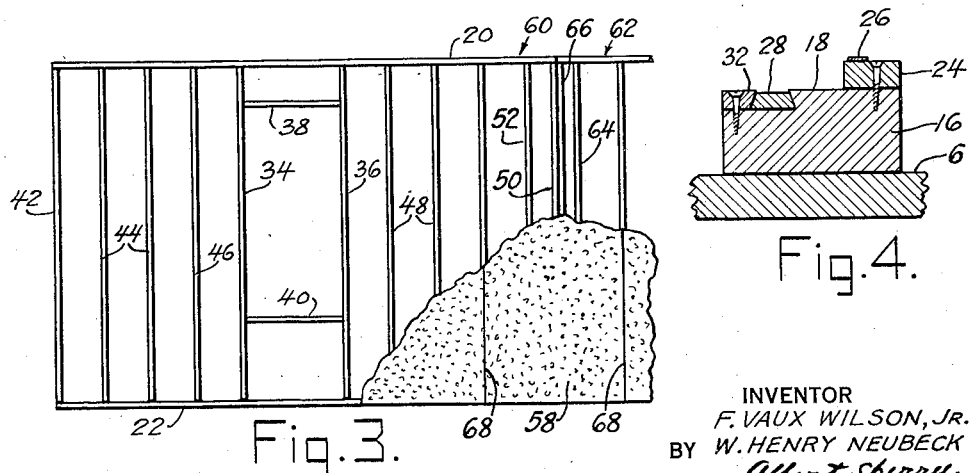
Fig. 3 is a view elevation of a typical wall section of the type produced on the jig table of Fig. 1 with a portion of the surface layer thereof removed to illustrate the construction more clearly.
Fig. 4 is an enlarged sectional view of one of the positioning elements taken on the line 4—4 of Fig. 1.

The elements 8 and 10 preferably are similar in construction and are formed as shown in Fig. 4 with a strip or block 16 provided with a bearing surface 18 on which members to be assembled in forming a building section or other construction may be positioned. In forming building sections such as that illustrated in Fig. 3 the elements 8 and 10 are preferably formed with the portions 18 sufficiently wide to receive and support the upper and lower plates or members 20 and 22 respectively. Abutment strips 24 extend longitudinally of the positioning elements adjacent the surfaces 18 to position the plates 20 and 22.

A scale 26 laid off in inches or other units of measure is fixedly secured to the abutment piece whereas a second scale 28 is slidably movable longitudinally of the positioning element and may be laid off with markers 30 which, when the jig table is used in constructing building sections, are preferably located on 16 inch centers. The slidable scale 28 is held in place by the strip 32 and the upper surface thereof is located beneath the supporting surface 18 of the positioning element. In this way the scale may be moved relative to the element while members are supported thereby.

The left hand guide means 12 for the movable positioning element 10 constitutes an end abutment against which members such as the upper and lower plates 20 and 22 on the positioning elements are moved to fix the end of the section.

In building a wall section such as that illustrated in Fig. 3 on the jig table illustrated the movable positioning element 10 is moved toward or away from the stationary positioning element 8 to locate the movable positioning element at a distance from the stationary element corresponding to the height of the section to be constructed. The plates 20 and 22 are then located along the bearing surfaces 18 of the strips 16 of the elements 8 and 10. When 2 by 4's are employed these plates are placed on edge and in abutment with the strips 24 with their ends against the left hand guide 12 as an abutment.

When openings are to be provided for doors or windows in the wall section being constructed the frame for such openings, consisting of side members 34 and 36 and upper and lower members 38 and 40, are assembled prior to constructing the wall section and are placed with the ends of the side members 34 and 36 resting upon the surfaces 18 on the positioning elements and in abutment with the upper and lower plates 20 and 22. The location of the frame for the openings is determined from the wall plan and the frame moved relative to the upper and lower plates until in the correct position as indicated by the stationary scale 26 on the abutment strip 24. The opening frame is thus located accurately prior to the assembling of studs or the like in the construction.

After the opening frame has been positioned the scales 28 on both of the positioning elements are moved until one of the indications 30 thereon is located adjacent the end abutment 12 whereby remaining indications 30 on the movable scales are located at 16 inch intervals from the end of the building section. The end stud 42 is then positioned so that its ends rest upon the supporting surfaces 18 on the positioning elements and the side thereof is adjacent the guide 12. Intermediate studs 44 are then located on 16 inch centers as shown by the indications 30 on the slidable scales progressing from the end stud 42 toward the side member 34 of the previously positioned opening frame. The stud 46 adjacent the side member 34 of the opening frame may be less than 16 inches from the member 34, but in that event the construction is strengthened and no difficulty is presented in the erection or use of the wall section.

After assembling the studs 42, 44 and 46 the slidable scales 28 are moved relative to the positioning elements until one of the indications 30 on each scale is located beneath the opposite side member 36 of the opening frame. The indications 30 are then each located at 16 inch intervals progressing from the side member 36 toward the right and the studs 48 may therefore be located quickly and accurately with the ends resting upon the supporting surfaces 18 on the positioning elements. An end stud 50 is located adjacent the ends of the upper and lower plates 20 and 22. The stud 52 adjacent the end stud 50 is located in the same manner as are the studs 48 although this stud may be spaced less than 16 inches from the end stud 50. However, this does not interfere with or weaken the construction of the wall section being made.

When the members used in constructing the frame work of the wall section have been properly positioned spacing members 54 are located between the movable positioning element 10 and a rear block 56 carried by the table. Preferably the spacing members 54 are forced into place so as to hold the members firmly in their assembled positions. The members are then secured together by nails or otherwise assuring construction of the wall section in an accurate manner. After the members have been secured together, wall board 58 or the like may be applied to the surface of the assembled frame of the wall section so that a completed wall section is formed which may be erected easily and with assurance that it will conform with the house plan from which it is made.

In constructing a wall section such as that of Fig. 3 it may be desired to arrange the studs on 16 inch centers progressing from the side members 34 and 36 of the opening frame toward the ends of the wall section in which case the location of the studs is established by first positioning one of the indications 30 beneath the side member 34 and then progressing toward the left as seen in Fig. 3 to the end of the wall section and subsequently positioning one of the indications 30 beneath the side member 36 of the opening frame and progressing toward the right therefrom in locating the studs. In this way any studs located less than 16 inches apart will be located adjacent the ends of the section. Similarly by starting from the opposite ends of the section and progressing toward the opening frame any studs located less than 16 inches apart may be located adjacent the opening frame.

When using more than one wall section in constructing a wall or the like, such as the sections indicated generally at 60 and 62 of Fig. 3, it is sometimes desirable to have the studs of the adjacent sections so located that they continue on from one section to another on 16 inch centers. This is particularly true when using wall board in the form of panels of predetermined width, say four feet for example. In such cases it is desirable to have the stud 64 adjacent the end stud 66 of section 62 located sixteen inches from the stud 52 of the adjacent section 60 instead of sixteen inches from the end stud 66. The edges 68 of each panel of the wall board 58 will then fall on the studs facilitating the securing of the panel thereto, no matter how many wall sections are employed and no matter how long the wall may be. This renders it possible to apply the wall board to the sections and over the ends of the sections without trimming or cutting the wall board or producing unnecessary joints between sections of the construction. This construction has the further advantage of locating the studs in such relation that piping and ducts passing up through the walls can be laid out in advance without determining separately the locations of the studs in each individual section of the wall.

When using the jig table of the present invention to construct succeeding wall sections of the type described the operations required are substantially the same as when constructing a single wall section. It is merely necessary to place the end stud 66 of the section 62 adjacent the end stud 50 of the section 60 and to position the stud 64 and each of the succeeding studs in the section 62 in the locations determined from the indications 30 on the slidable scale 28 progressing from left to right. When the jig table is too short to assemble a second section on the table without removing that first assembled, the proper spacing of the stud 64 from the end stud 66 on the succeeding section is established by noting on scale 26 the distance from the end stud 52 of section 60 to the next indication 30 on the scale 28. The scale 28 is then moved longitudinally until an indication 30 thereon is the distance noted from the abutment 12 on the left hand end of the table. This establishes the location of the stud 64 with respect to end stud 66 of the section 62 so that the remaining studs may be spaced therefrom on sixteen inch centers correspondingly to the indications 30 on the scale 28.

It will be apparent from the foregoing description of the invention as employed in constructing a typical wall section that the jig table provided may be used in making wall sections or other constructions of any desired length or width and having any number of openings or special constructions therein and that in each case the members from which the wall section or construction is to be made can be completely assembled and arranged in position before being secured together. Therefore the members may be secured together without being removed from the jig table. Thus it is possible to construct wall sections corresponding to any house plan and to do so quickly and economically without the tedious calculations and the danger of error incident to the erection of wall sections by the usual methods.

The jig table possesses the flexibility of use and operation which serves not only to permit its use in the construction of wall sections of any desired dimensions and having any desired number and arrangement of openings therein, but also is adapted for use in producing other types of construction. Moreover, it should be understood that numerous changes and modifications may be made in the construction and arrangement of the parts employed particularly when using the invention in constructing other types of wall sections or other constructions than that shown in Fig. 3. For this reason it should be understood that the form of the invention herein shown and described is intended to be illustrative thereof and is not intended to limit the scope of the invention.

We claim:

1. A method of constructing a building section on a jig table having parallel fixed and movable positioning elements, abutment means adjacent one end of said elements and scales having indications spaced sixteen inches apart associated with said elements, comprising the steps of locating said movable element a distance from said fixed element corresponding to the height of the building section to be produced, locating upper and lower members of the section on said elements with one end of each member engaging said abutment means, locating an opening frame between said upper and lower members and between the ends thereof, with the center of the frame located a predetermined distance from said abutment means, locating a stud adjacent said abutment means with the ends thereof engaging said upper and lower members, placing said scale with an indication thereon beneath said stud, successively placing other studs with their ends adjacent said upper and lower members and in locations indicated by said indications on said scale beginning from the first stud and progressing toward said opening frame, shifting said scale to locate an indication thereon adjacent the opposite side of said opening frame and successively locating additional studs with their ends adjacent said upper and lower members and in the locations indicated by the indications on said scale progressing in the same direction as before toward the end of said upper and lower members and securing said members together when so arranged.

2. A method of constructing a building section on a jig table having parallel fixed and movable positioning elements, abutment means adjacent one end of said elements and scales having indications spaced sixteen inches apart associated with said elements, comprising the steps of locating said movable element a distance from said fixed element corresponding to the height of the building section to be produced, locating upper and lower members of the section on said elements with one end of each member engaging said abutment means, locating an opening frame between said upper and lower members and between the ends thereof, with the center of the frame a predetermined distance from said abutment means, locating studs adjacent the ends of said members with the ends of the studs engaging said upper and lower members, positioning said scale with one of the indications thereon adjacent one of said studs, successively positioning additional studs with their ends engaging said upper and lower members and in the positions indicated by the indications on said scale, progressing from one end toward said opening frame, thereafter shifting said scale to locate an indication thereon beneath the stud at the other end of said upper and lower members, successively locating additional studs in the positions indicated by the indications on said scale progressing from the latter end of said members toward said opening frame, and securing the members so arranged together.

3. A method of constructing a building section on a jig table having parallel fixed and movable positioning elements, abutment means adjacent one end of said elements and scales having indications spaced sixteen inches apart associated with said elements, comprising the steps of locating said movable element a distance from said fixed element corresponding to the height of the building section to be produced, locating upper and lower members of the section on said elements with one end of each member engaging said abutment means, locating an opening frame between said upper and lower members and between the ends thereof, with the center of the frame in a predetermined distance from said abutment means, locating studs with the ends thereof engaging said upper and lower members and adjacent the ends of said members, positioning each of said scales with one of the indications thereon adjacent one side of said opening frame, successively positioning other studs with the ends thereof adjacent said upper and lower members and in the positions indicated by the indications on said scales, progressing from said frame toward the end stud on that side of said frame, shifting said scales to locate an indication thereon adjacent the opposite side of said frame, successively locating additional studs with the ends thereof engaging said upper and lower members and in the positions indicated by the indications on said scales, progressing from the opening frame toward the opposite end stud, and securing the members so arranged together.

4. A method of constructing a series of building sections with studs in the adjacent sections located at equal and related intervals, by means of a jig table having parallel fixed and movable positioning elements, abutment means adjacent one end of said elements, a fixed scale extending longitudinally of said elements and a slidable scale also extending longitudinally of said elements and provided with indications therein spaced sixteen inches apart, which method comprises the steps of locating said movable positioning element a distance from said fixed positioning element corresponding to the height of the building section to be produced, locating upper and lower members of the section on said elements with one end of each member engaging said abutment means, locating end studs with their ends engaging said upper and lower members and adjacent the ends of said members, locating said slidable scale with an indication thereon adjacent said abutment means, locating studs with their ends adjacent said upper and lower members and in positions determined by the indications on said slidable scale, noting on said fixed scale the distance between the end stud remote from said abutment means and the next indication on said movable scale, removing the section first assembled from said table, moving said slidable scale until one of the indications thereon is located the distance noted from said abutment means and then assembling another section on said table as before but with the studs thereon located in positions determined by the indications on the slidable scale when so moved.

F. VAUX WILSON, Jr.
W. HENRY NEUBECK.